Sept. 11, 1928.  
C. H. SHEASLEY  
1,683,734  
AUTOMOTIVE HOISTING ENGINE  
Original Filed March 16, 1923　4 Sheets-Sheet 1

INVENTOR  
Charles H. Sheasley  
BY  
Edward R. Inman  
ATTORNEY

Sept. 11, 1928.
C. H. SHEASLEY
1,683,734
AUTOMOTIVE HOISTING ENGINE
Original Filed March 16, 1923    4 Sheets-Sheet 2
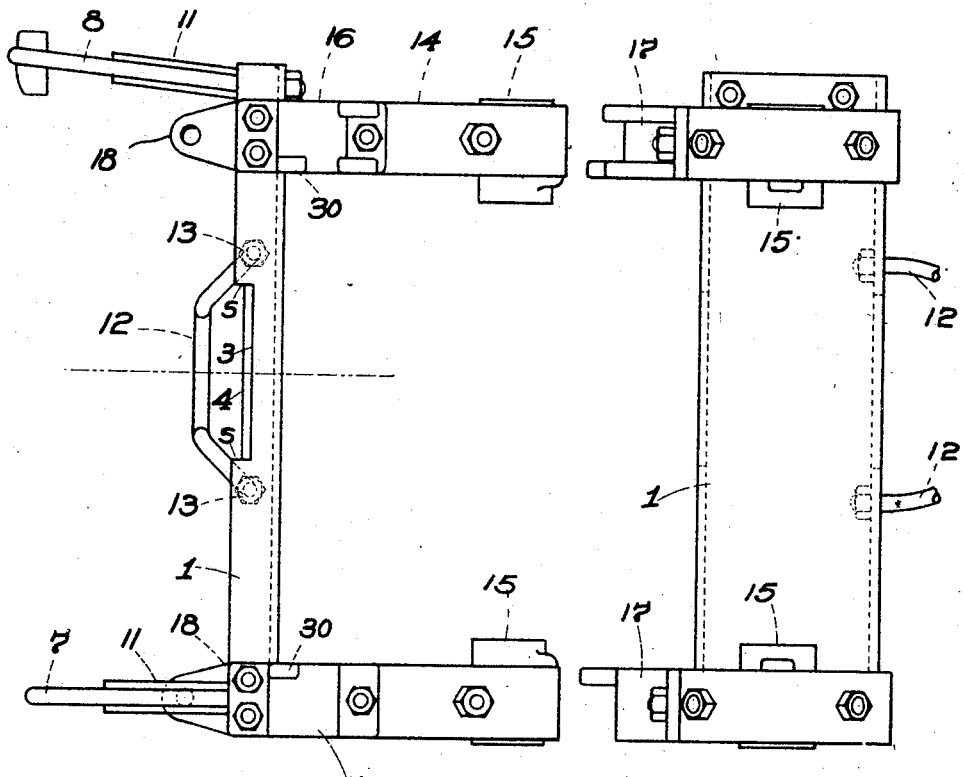
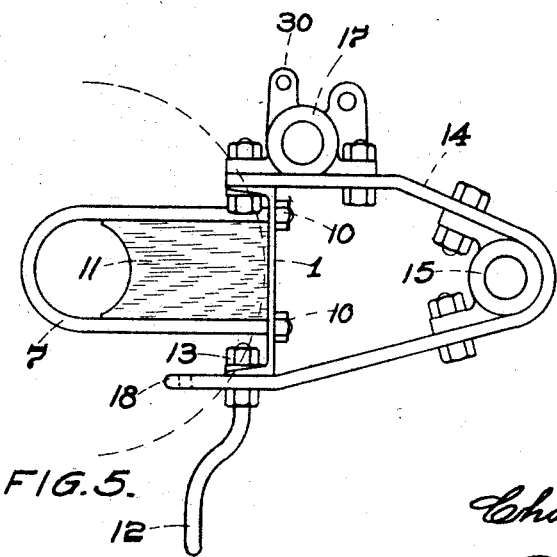
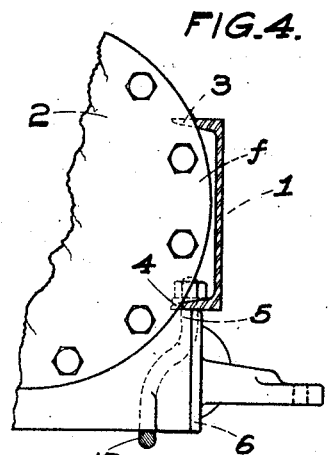
INVENTOR
Charles H. Sheasley
BY
Edward R. Inman
ATTORNEY

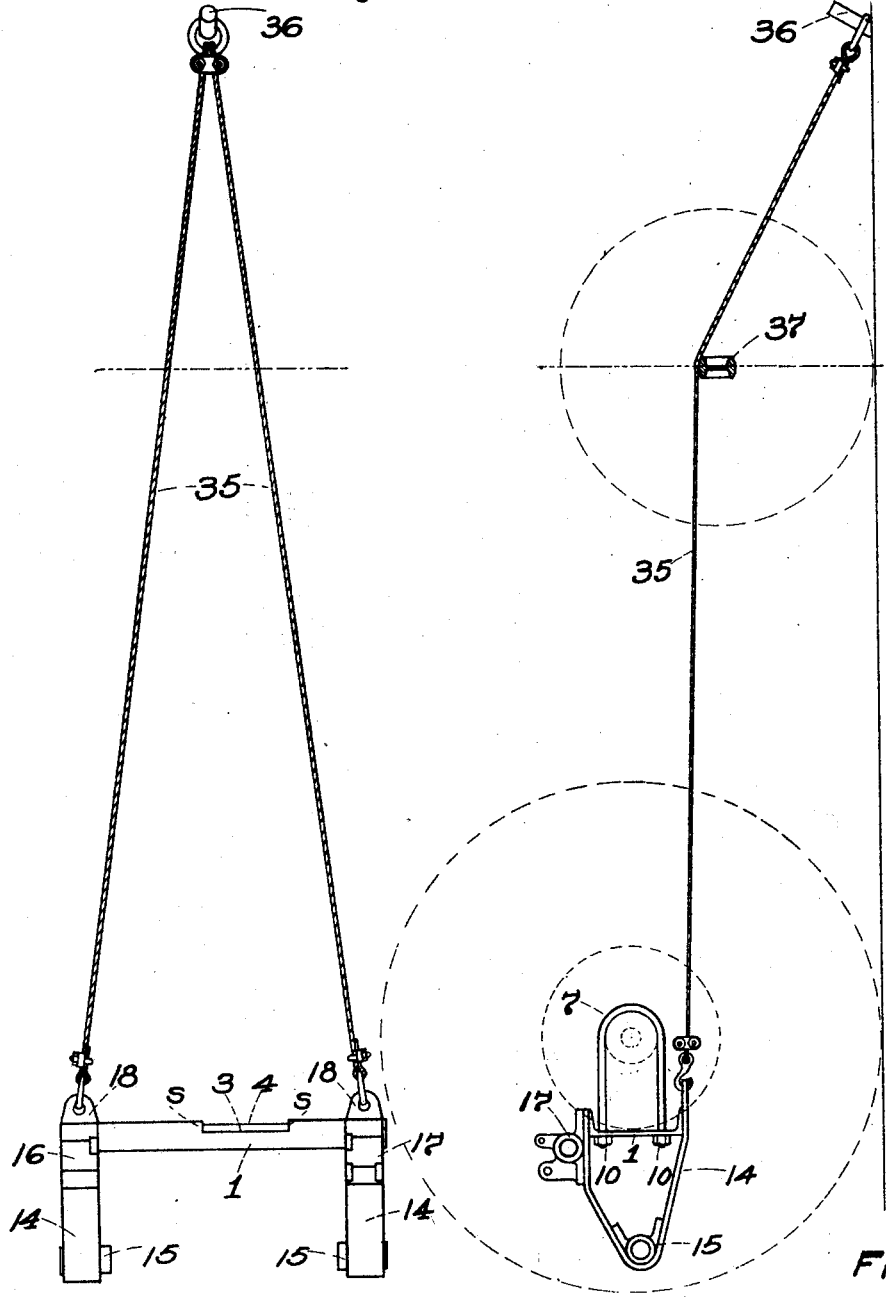

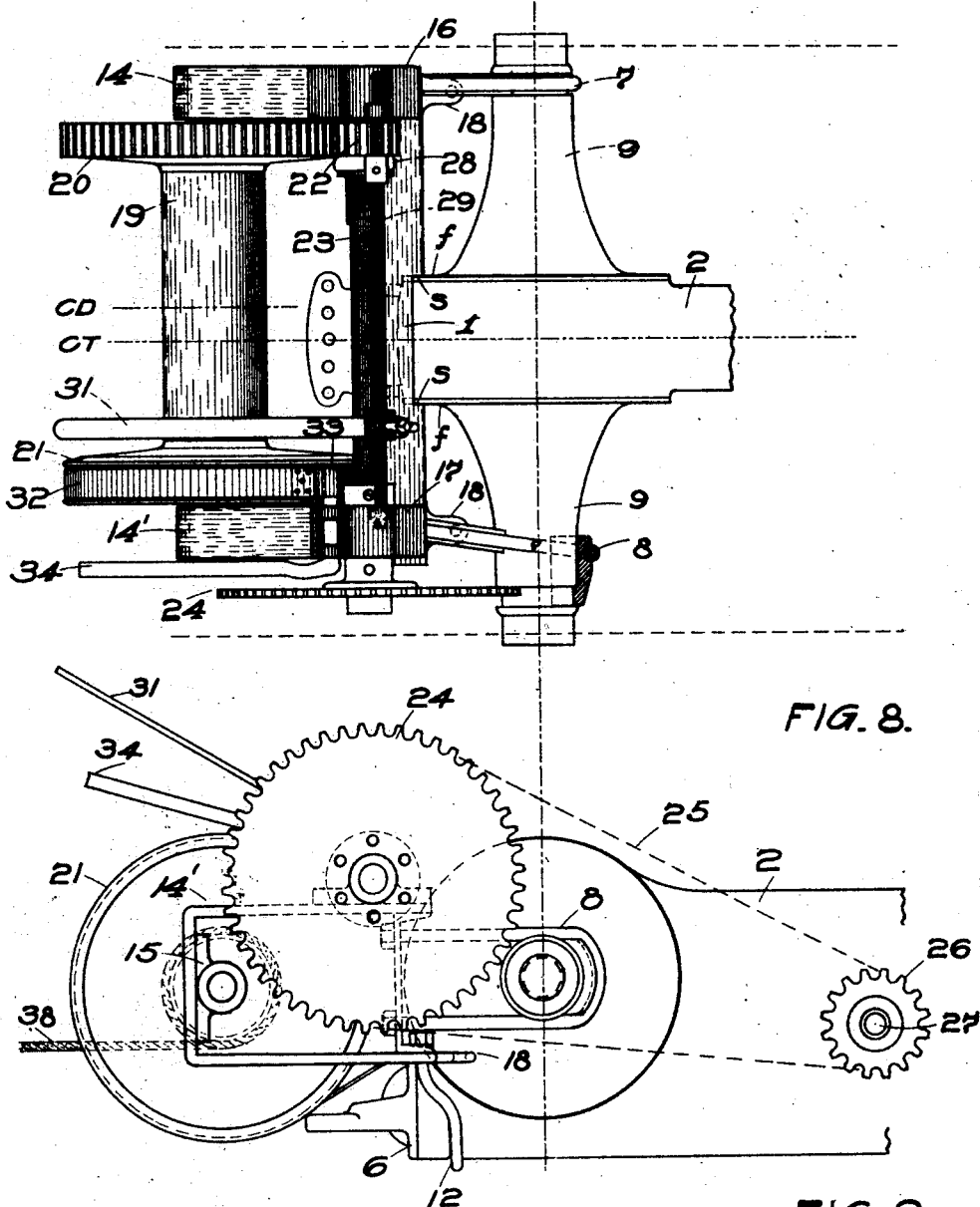

Patented Sept. 11, 1928.

1,683,734

UNITED STATES PATENT OFFICE.

CHARLES H. SHEASLEY, OF FRANKLIN, PENNSYLVANIA.

AUTOMOTIVE HOISTING ENGINE.

Application filed March 16, 1923, Serial No. 625,439. Renewed November 4, 1925.

This invention relates to a hoisting organization to be carried by a tractor and operated by the motor thereof. The invention relates more especially to a hoisting organization to be applied to a Fordson tractor. This invention further relates to anchorage means for such a hoist whereby the tractor organization proper will be largely relieved from any undue strain which the tractor was not originally designed to withstand.

It is true, however, that hoisting equipment which has heretofore been applied to tractors of the type mentioned subject the same to undesirable strains, and in some cases to such undesirable, unnecessary, and unscientifically-distributed strains as to amount to an actual abuse of the tractor organization. Such practice must be eliminated in the interests of safety, efficiency and economy in order that the art may be advanced to its proper status, to which it is entitled by reason of the large field and wide demand for an automotive hoisting engine of this type.

It is, therefore, the object of this invention to provide a hoisting engine equipment for tractors and an anchorage for same whereby the tractor organization proper will be relieved from unnecessary and detrimental strains.

Another object of this invention is, to provide a hoisting organization for tractors which will be sufficiently rigid to withstand the strains to which it is subjected without yielding thereto or being warped out of alinement thereby.

Still another object is, to provide a mounting structure for the hoisting drum of a hoist of this type which will be more compact, simple, in closer conformity to engineering principles, and cheaper to construct than those which have been heretofore employed.

Another object is, to provide a hoisting organization for tractors which can be applied and attached thereto without removing, changing or in any way disturbing or interfering with a single element or detail of the tractor, or in any manner interfering with any of its normal or usual functions.

The construction whereby I am enabled to attain said objects is clearly illustrated in the accompanying drawings in which:

Fig. 3 is a plan view of the carrying structure or frame of the hoist.

Fig. 4 is a rear elevation of said frame.

Fig. 5 is a side elevation thereof.

Figure 1:
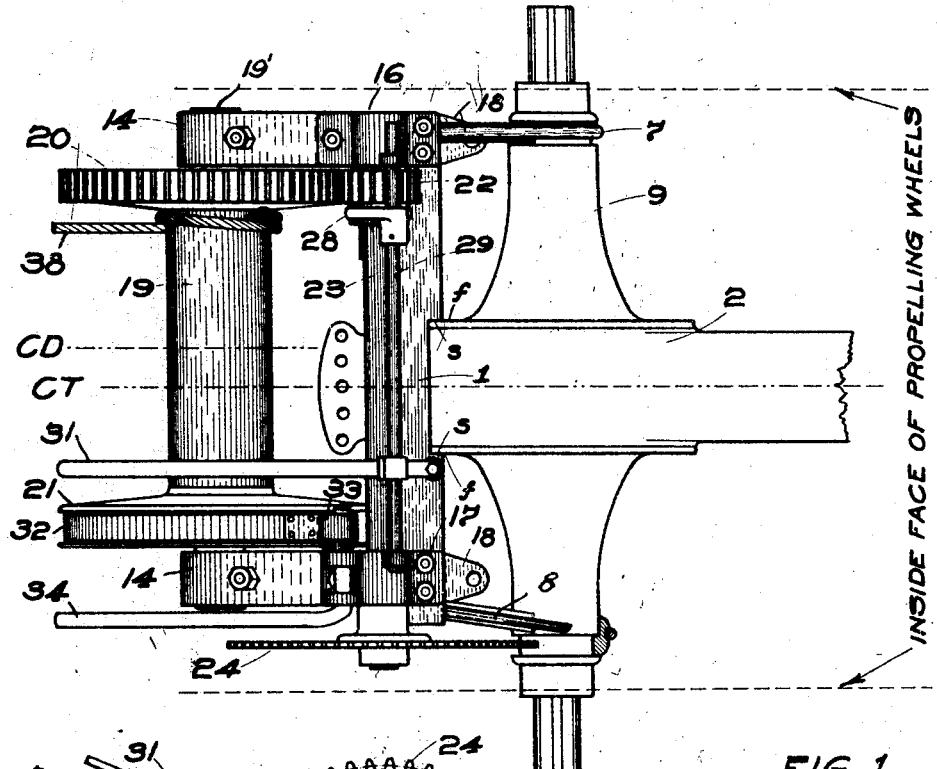
Fig. 1 is a plan view of my improved hoist and the adjacent portion of the tractor frame to which it is attached.
Figure 2:
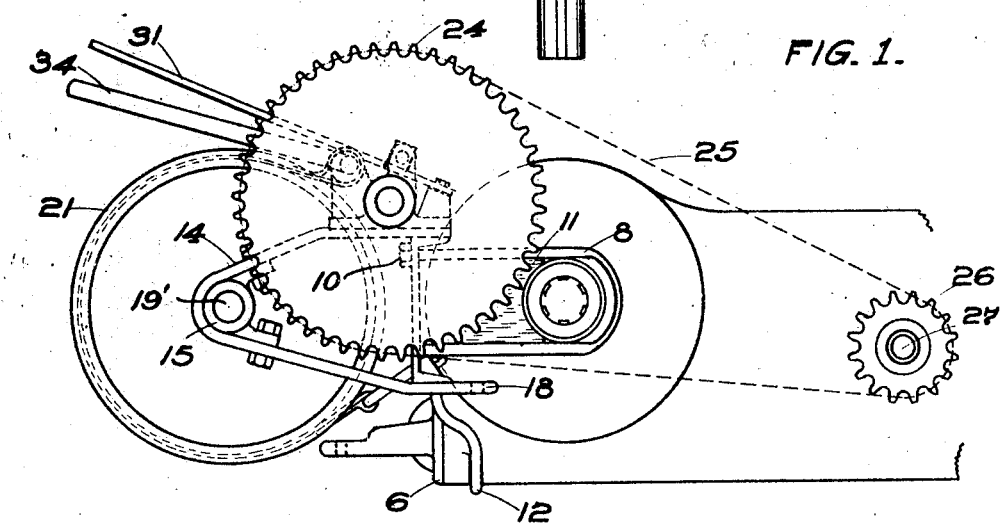
Fig. 2 is a side elevation of said hoist and the portion of the tractor frame adjacent thereto.

Fig. 5$^a$ is a sketch showing the way in which the main element of said carrying frame is supported vertically.

Fig. 6 is a plan view intended especially for the purpose of illustrating the anchorage of my hoisting organization, in which the forward axle of the tractor is indicated by a dotted line.

Fig. 7 is a side elevation of said anchorage.

Fig. 8 is a plan view of a hoisting organization having a modified form of drum support.

Fig. 9 is a right side elevation of the organization shown in Fig. 8.

The construction illustrated in said drawings is substantially as follows:

The main member of the carrying frame for the drum of the hoist and the elements directly co-operating with said drum, is a unitary element consisting of a structural steel channel 1. Said channel is positioned rearwardly of that portion of the frame or transmission housing 2 of the tractor organization which encloses the differential gear; the web of said channel is disposed vertically and in parallel alinement with said axle housings, and the flanges of said channel are disposed horizontally, and forwardly relatively to the tractor organization. At the point immediately adjacent said frame 2 said flanges are provided with gaps, 3, 4, the length of which is equal to the distance between the lateral, vertical faces $f, f$ of said frame 2. When said channel is placed in its service position said gaps receive the adjacent portion of said frame and the shoulders $s, s$, of said gaps are in contact respectively with said lateral faces $f, f$. This construction and manner of assembly serves two important offices, namely, it prevents the longitudinal movement of said channel 1, it also holds the same in rigid, accurate horizontal alinement so that no vertical wabbling or tilting movement can take place. This method of securing the stability set forth of said channel 1 is an important point in my invention and construction for the reason that it dispenses, at this point, with elemental attaching means and avoids disturbing any of the securing and assembly elements of the tractor organization proper.

Said channel is supported vertically by resting upon either the feature 5 of said frame, to which feature the draw-bar lug flange is bolted; or it may rest upon the upper edge of said draw-bar lug flange 6,—see Fig. 5a. Said feature 5, as shown is a projection formed upon the frame of the tractor and having its outer, rear face adapted for the reception and attachment of the flange 6 together with the draw-bar lug which is formed integrally with said flange; any other suitably-located projection, whether formed integrally with said frame, or otherwise, secured thereto, would serve the purpose equally well. Inasmuch, however, as the upper face of said feature 5 is not a finished and accurately-located face, which is likewise true of said upper edge of said flange 6, said channel may, in some cases, rest upon one of these points and in other cases upon the other point, but either one is suitable and affords a firm support for said channel 1.

For the purpose of retaining said channel 1 in the previously-stated relation to said frame 2, two tension members are employed which are shown in the drawings in the form of U-bolts 7 and 8. The bend of these bolts passes around the axle housings 9,—one adjacent the end of each housing—and their ends pass through the web of said channel adjacent the respective ends thereof. The required tension to draw the flanges of said channel into said contactual engagement with said housing is effected by means of the nuts 10, 10 which co-operate with screw-threads upon said ends of said U-bolts.

For the purpose of preventing any longitudinal bowing or flexure of said channel which the screwing up of said nuts 10 may tend to produce, a distance piece 11 is placed between the juxtaposed faces of said channel and said housings 9. Said distance piece is preferably non-metallic so that it will, to a certain extent, absorb the vibration incidental to the operation of the chain drive of the winch, also of the driving gear and pinion.

Said channel 1 is retained in its bearing position upon the face of said feature 5 or said flange 6 by means of a stirrup 12 which passes around the under side of said housing 2; the ends of said stirrup pass through the lower flange of said channel and nuts 13, 13, are screwed thereon into contact with the upper face of said flange, thus preventing any lifting of the hoisting organization or any jolting thereof with might otherwise be caused, as when the tractor is traveling over rough roads or upon pavements.

Secured to each end of said carrying member 1 is a bearing support 14, 14, which carries the bearing 15, 15, for a drum-shaft, also bearings 16, 17, for a pinion shaft. Said bearing supports may be secured to said member 1 by means of bolts as shown in Figs. 3, 4 and 5, and said bearings may be secured to said supports by bolts, as shown, or in any other suitable way. Furthermore, said supports 14, 14, and their respective bearings may be formed as integral elements.

The lower arm of each of said supports 14 is extended forwardly and this projecting end is formed into an anchor-engaging eye, 18, the object and utility of which will be presently set forth.

The operating elements of my hoisting organization comprise the following details:

The drum consists of a barrel 19, the driving gear 20 and the brake-head 21, these two latter elements being secured rigidly to said barrel; the shaft 19' of said drum is revolubly mounted in said bearings, and said drum is rigidly keyed to said shaft.

Said gear 20 and said members 19 and 21,—which form practically an integral structure,—are driven by the pinion 22 which is splined to the pinion shaft 23, and said shaft 23 is driven by the sprocket gear 24. Said pinion shaft is revolubly mounted in the bearings 16, 17. Said sprocket gear 24 is driven through the chain, indicated by the dotted line 25, from the power take-off or sprocket pinion 26 secured to the belt-pulley shaft 27 of the tractor; said shaft 27 is provided especially for the purpose of transmitting operating power to machinery extraneous to the tractor organization proper.

Said pinion 22 is adapted, through its splined connection to said shaft 23, to be moved longitudinally thereon, into and out of mesh with said gear 20 and for this purpose said pinion is engaged by a yoke 28 secured to a longitudinally-movable rod 29 which is mounted in the bearing lugs 30, 30, formed integrally with said bearings 16, 17. A swinging actuating lever 31 is connected to said rod 29 to actuate same together with said yoke and said pinion 22.

When said pinion 22 is disengaged from said gear 20, thus rendering said gearing 20—22 inoperative retrograde motion of the drum may take place and for the purpose of arresting or controlling said retrograde movement, as desired, a brake band 32 is passed around the periphery of said brake-head 21; one end of said band 32 is attached in any suitable way to the lower edge of said channel 1 and the other end of said band is connected to a crank or eccentric 33 which is actuated by the brake lever 34 to cause the engagement and disengagement of said band 32 with said periphery of said brake head; the degree of said engagement may vary from a mere slight control of speed to one of complete arrestment of said retrograde movement, as may be required.

With reference to the details of said drum and the elements directly co-operating therewith as designated by the reference ordinals from 19 to 34, they are not broadly new, and have in various substantially equivalent forms been employed in hoisting winches in oil field work for a period of more than forty years.

Their approximate equivalent may also be found in a winch illustrated on page 2338 of the 1912 edition of Webster's New International Dictionary, published by G. & C. Merriam. I claim such drum structure and elements only in connection with my improved mounting structure for same in an automotive hoisting engine.

The anchorage arrangement which I employ and the way in which the tractor frame is thereby relieved of the tensional strain exerted by the pull and load upon the hoisting cable 38, as illustrated in Figs. 6 and 7, will now be described: As previously mentioned, an anchorage eye 18 is rigidly connected to each end of the drum-mounting structure. Into each of said eyes is connected one end of the anchor lines 35; the other end of said lines are secured to any suitably firm anchorage, as a stake 36 that is firmly driven in the ground. The tractor proper is not anchored. Upon the initial starting of the drum for its hoisting operation, the tension upon the hoisting cable 38 tends to draw the tractor rearwardly, in the direction of the load, thus drawing said anchor lines 35 taut, whereupon all the tension exerted through said hoisting cable upon the drum, is transmitted to and sustained by said anchor lines 35 instead of by said axle-housings 9 and other portions of the frame of the automotive organization proper. Said lines 35 are shown as passing over the front axle 37 and this is preferably, but not necessarily the arrangement employed. The reason for passing said cables over said front axle is, to prevent the front end of said automotive organization, or tractor, from being raised in case conditions are such as to require a downward slant toward the load, of the hoisting cable, such as would occur from locating the tractor over a pit or adjacent to an inclined elevating track, such as commonly employed in the filling of ice-houses and the like.

However, in the operation of this and similar hoists, the hoisting cable is usually passed through a "heel block" located directly to the rear of the drum, and in such cases it is not necessary to pass the lines 35 over the front axle.

Said eyes 18 need not be of the precise form shown, nor carried by the hoisting organization in the manner illustrated; the essential requirement being, that the hoisting organization proper shall be provided with a suitable anchorage attachment for the direct anchorage of said organization, instead of such an anchorage as heretofore been employed, which consists in anchoring the automotive organization proper, or the tractor, as by blocking the propelling wheels or attaching the anchorage chain or cable to some portion of said last-mentioned organization, or tractor and connecting said chain or cable to a stake or the like. Let it be noted that this latter method of anchorage differs from that of my own in the fact that it does not serve to relieve the tractor frame of the strain caused by load and tension upon the hoisting cable.

By reference to Fig. 1 of the drawings it will be noted that the longitudinal center line C—T of the tractor and the transverse center line C—D of the drum do not coincide. This non-coincidence of said center lines is avoidable if a drum of suitable length and line capacity is to be employed; the reason for this is found in the matter of space that is required for and occupied by the sprocket-gear 24 at one end of the hoisting organization.

As heretofore constructed, a carrying frame of a hoisting organization of the present type has been attached by elemental attaching means directly to the vertical facer $f$, $f$. Because of such attachment, there is much more of an overhang and unsupported lateral projection of said frame upon one side of said faces than upon the other. In such case, when a heavy pull is being exerted upon the hoisting cable and it is being wound upon that end of the drum which is farthest from the attaching support, as indicated in Fig. 1, which periodically occurs and is due to the spooling of the cable, a severe wrenching strain is exerted upon the mounting frame of the hoisting organization and upon said main frame of the automotive organization. In numerous cases this strain has been so great as to cause an improper meshing of the gear 20 and the pinion 21, the result of which was the stripping of the teeth therefrom, thus causing accidents and necessitating expensive repairs.

Attention is now directed to the novel manner in which the bearings 15 for the drum shaft are carried by the brackets or supporting members 14. Said bearings are positioned upon the inside of substantially U-shaped supports or brackets in such a manner that the opeartive stresses to which said bearings are subjected, are exerted toward that portion of said support 14 with which said bearings are respectively in contact, instead of away from it as heretofore. This method of mounting said bearings relieves the attaching bolts of all tensile strain and greatly adds to the strength, safety and durability of the hoisting organization, and is a further elaboration of the anchorage principle herein employed.

In my improved hoisting organization and in the method of connecting same to its co-operative automotive organization, objectionable conditions and serious defects as to weakness hertofore existing in simialr equipment are wholly eliminated.

In addition to such elimination, the anchorage facilities which are here disclosed and supplied, relieve said automotive organization of all strain other than that due to the weight of the hoisting organization. The power requirement and its utilization for and application to the hoisting equipment conforms to and is in accordance with conditions to which due consideration have been given in the design of the automotive organization.

The construction illustrated in Figs. 8 and 9 of the drawings differs from that shown in former figures, and previously described, only, in the respect that the bracket or drum-supporting members 14' have a substantially rectangular, instead of a substantially U-shaped form, and with this slight difference noted, the description applies to said figures as well as to the other figures of the drawings.

I claim the following:

1. In an automotive hoisting engine which includes a hoisting drum, driving gearing for said drum arranged to be rendered operative or inoperative at will, also a brake arranged to be rendered operative when said driving gear is inoperative, a transporting means for said drum consisting of an automotive organization having a main frame which includes axle housings and a power takeoff for the purpose of operating extraneous machinery; the combination with the foregoing of a mounting structure for said drum, gearing and brake comprising in combination, a carrying member for the bearing supports of said hoisting drum consisting of a unitary element positioned to the rear of said frame, disposed in parallel relation to said axle housings and supported vertically by contact with a portion of said frame and having engagement with vertically-disposed faces thereof whereby a movement of said element transversely to said frame, also a vertical tilting movement of said element are prevented, U-bolts passing around the respective axle housings and having threaded ends passing through the adjacent end of said carrying member, nuts cooperating with said threaded ends and bearing upon the rear faces of said member whereby the same is secured in said contact and engagement with said frame, means preventing the flexure of said carrying member by the stress exerted thereon by said nuts, drum supports carried by said carrying member, and bearings for the respective shafts of said drum and said gearing carried by said drum supports.

2. In an automotive hoisting engine which includes a hoisting drum, driving gearing for said drum arranged to be rendered operative or inoperative at will, also a brake arranged to be rendered operative when said driving gear is inoperative, a transporting means for such drum consisting of an automotive organization having a main frame which includes axle housings, also a power take-off for the purpose of operating extraneous machinery; the combination with the foregoing of a mounting structure for said drum, gearing and said brake comprising in combination, a unitary carrying member for the bearing supports of said hoisting drum consisting of a structural steel channel positioned rearwardly of said frame with its web vertically disposed and in parallel alinement with said housings, a U-bolt for each end of said channel passing around the adjacent axle housing and having its ends threaded and inserted through the web of said channel, nuts cooperating with said threaded ends and bearing upon the rear faces of said web for the purpose of retaining said channel in said relation to said frame, a nonmetallic spacer interposed between the adjacent faces of said channel and said axle housings adapted to prevent the flexure of said channel toward said housings, anchorage-engaging devices carried by said channel, anchorage lines connected to said anchorage-engaging devices arranged and adapted to sustain the stresses in the hoisting organization caused by the tension exerted by and upon the hoisting cable so as to prevent the transmittal of said stresses to the main frame aforesaid, said lines being passed across the front axle of said automotive organization for the purpose of preventing the lifting of the front end of said organization, drum supports carried by said channel, and bearings for the respective shafts of said drum and said gearing carried by said drum supports.

3. In an automotive hoisting engine which includes a hoisting drum, driving gearing for said drum arranged to be rendered operative or inoperative at will, also a brake arranged to be rendered operative when said driving gearing is inoperative, a transporting means for such drum consisting of an automotive organization having a main frame which includes axle housings and a power take-off for the purpose of operating extraneous machinery; the combination with the foregoing of a mounting structure for said drum, gearing and brake comprising in combination, a carrying member for the bearing supports of said drum and said gearing consisting of a channel member positioned rearwardly of said frame with its flanges disposed toward and arranged in engagement with said frame, anchorage means connected to said channel adapted to receive and sustain the tensional stresses exerted by the hoisting cable and thereby to relieve said frame of such stresses as may be exerted by said cable, or upon the same, U-shaped drum supports carried by said channel and attached thereto adjacent their open ends, and bearings for the respective shafts of said drum and said gearing carried by said drum supports, said bearings for said drum shaft being secured to the inner face of their respective supports whereby tensional strain upon the attaching bolts for said bearings is avoided.

4. In an automotive hoisting engine which includes a hoisting drum, driving gearing for said drum arranged to be rendered operative or inoperative at will, a brake for said drum arranged to be rendered operative when said driving gearing is inoperative, a transporting means for such drum consisting of an automotive organization having a main frame which includes axle housings and a power take-off for the purpose of operating extraneous machinery; the combination with the foregoing of a mounting structure for said drum, gearing and said brake comprising in combination, a carrying member for the bearing supports of said drum consisting of a structural steel channel positioned rearwardly of said frame with its flanges disposed toward and adapted to engage said frame so as to prevent both longitudinal movement and downward movement of said channel relative to said frame, means connecting the respective ends of said channel to the axle housing adjacent thereto whereby said channel is secured in said relation to said frame, a stirrup passing around the under side of said frame with its ends in engagement with the lower flange of said channel, whereby upward movement of said channel relative to said frame is prevented, drum supports carried by said channel, and bearings for the respective shafts of said drum and said gearing carried by said drum supports.

5. In an automotive hoisting engine which includes a hoisting drum, driving gearing for said drum arranged to be rendered operative or inoperative at will, also a brake for said drum arranged to be rendered operative when said driving gearing is inoperative, a transporting means for such drum consisting of an automotive organization having a main frame which includes axle housings, also a power take-off for the purpose of operating extraneous machinery; the combination with the foregoing of a mounting structure for said drum and said gearing comprising in combination, a carrying member for the bearing supports of said drum and said gearing consisting of a structural steel channel positioned rearwardly of said frame with its flanges disposed toward and adapted to engage said frame so as to prevent both longitudinal movement and a downward movement of said channel relatively to said frame, a U-bolt passing around the respective axle housings and having its ends threaded and inserted through the corresponding end of the web of said channel, nuts cooperating with said threaded ends and bearing upon the rear face of said web for the purpose of retaining said channel in said relation to said frame, a vibration-absorbing member interposed between the adjacent faces of said carrying member and said axle housings, means preventing the upward movement of said channel relative to said frame, anchorage-engaging devices carried by said channel, anchorage lines connected to said anchorage-engaging devices and passing over the forward axles and bearing thereon whereby the lifting of the front end of said organization is prevented, drum-supports carried by said channel, and bearings for the respective shafts of said drum and said gearing carried by said drum supports.

6. In an automotive hoisting engine which includes a hoisting drum, driving gearing for said drum arranged to be rendered operative or inoperative at will, also a brake for said drum arranged to be rendered operative when said driving gearing is inoperative, transporting means for said drum consisting of an automotive organization having a main frame which includes axle housings, and a power take-off for the purpose of operating extraneous machinery; the combination with the foregoing of a mounting structure for said drum, gearing and brake comprising in combination, a unitary carrying member for the bearing supports of said hoisting drum consisting of a channel member, means rigidly connecting said channel member to said main frame, a drum-supporting member connected to each end of said carrying member, and a bearing for the shaft of said drum carried by each of said supporting members in such manner that the operative stresses to which said bearings are subjected are toward that portion of said supporting member with which said bearings are respectively in contact.

7. In an automotive hoisting engine which includes a hoisting drum, driving gearing for said drum arranged to be rendered operative or inoperative at will, also a brake for said drum arranged to be rendered operative when said driving gearing is inoperative, a transporting means for said drum consisting of an automotive organization having a main frame which includes axle housings and a power take-off for the purpose of operating extraneous machinery; the combination with the foregoing of a mounting structure for said drum, gearing and brake comprising in combination, a structural steel channel positioned rearwardly of and attached to said frame, disposed in parallel relation to said housings and arranged for the reception of bearing supports for said drum and said gearing, tensional means engaging each end of said channel and the axle housing adjacent thereto and arranged to secure said channel in said relation, means preventing the flexure of said channel tending to be caused by the tensional stresses exerted by said tensional means, drum supports carried by said channel, and mounting means for said drum and said gearing carried by said drum supports.

8. In an automotive hoisting engine which includes a hoisting drum, driving gearing for said drum arranged to be rendered operative or inoperative at will, also a brake for said drum arranged to be rendered operative when said driving gearing is inoperative, a transporting means for said drum consisting of an automotive organization having a main frame which includes axle housings and a power-take-off for the purpose of operating extraneous machinery; the combination with the foregoing of a mounting structure for said drum, gearing and brake comprising in combination, a unitary carrying member for bearing supports for said hoisting drum positioned rearwardly of said frame, supported vertically by a projecting portion of said frame, said member being maintained in its transverse relation to and prevented from having vertical tilting motion relative to said frame by engagement therewith, tensional means engaging each end of said carrying member and the end of the axle housing adjacent thereto securing said member in said relation to and engagement with said frame, means preventing the upward movement of said member relative to said frame, drum supports carried by said member, and bearings for the respective shafts of said drum and said gearing carried by said supports.

9. In an automotive hoisting engine, the combination of an automotive organization comprising a main frame having a rear axle housing and a power take-off, with a drum, driving gear and a brake for said drum, a channel bar extending longitudinally of said axle housing and having its web in a vertical plane with its flanges extending towards said axle housing, said flanges being centrally notched or cut away to form oppositely disposed interiorly facing shoulders engaging complementary shoulders on said housing, means restraining said bar from vertical and horizontal movement relative to said housing, and bearings carried by said channel bar for the shafts of said drum and gearing.

10. In an automotive hoisting engine, the combination of an automotive organization comprising a main frame having a rear axle housing and a power take-off, with a drum, driving gear and a brake for said drum, power-transmitting connections between said driving gear and said take-off, a channel bar having its web in a vertical plane and its flanges extending horizontally one above the other, said flanges being notched to form shoulders engaging vertical faces on the axle housing, means restraining said bar against vertical movement, means restraining said bar against horizontal rearward movement relative to said axle housing, and bearings carried by said channel bar for the shafts of said drum and gearing.

11. In an automotive hoisting engine, the combination of an automotive organization comprising a main frame having a rear axle housing and a power take-off, with a drum, driving gear and a brake for said drum, a transversely extending channel bar supported with its web vertical and parallel to said axle housing, the lower flange of said bar resting on a shoulder of said axle housing and one of the flanges thereof having shoulders engaging vertically disposed faces on said axle housing, means extending between the ends of said bar and the axle housing and between the lower flange of said bar and the said housing and holding the same in engagement, and bearings carried by said channel bar for the shafts of said drum and gearing.

In testimony whereof I affix my signature.

CHARLES H. SHEASLEY.